(12) United States Patent
Song et al.

(10) Patent No.: US 11,721,491 B2
(45) Date of Patent: Aug. 8, 2023

(54) MULTILAYER ELECTRONIC COMPONENT

(71) Applicant: SAMSUNG ELECTRO-MECHANICS CO., LTD., Suwon-si (KR)

(72) Inventors: Jun Il Song, Suwon-si (KR); Sang Won Choi, Suwon-si (KR); Seung Heui Lee, Suwon-si (KR); Su Min Shin, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 86 days.

(21) Appl. No.: 17/506,072

(22) Filed: Oct. 20, 2021

(65) Prior Publication Data

US 2022/0208471 A1    Jun. 30, 2022

(30) Foreign Application Priority Data

Dec. 24, 2020    (KR) .................... 10-2020-0183841

(51) Int. Cl.
 *H01G 4/30* (2006.01)
 *H01G 4/008* (2006.01)
 *H01G 4/12* (2006.01)
 *H01G 4/012* (2006.01)

(52) U.S. Cl.
 CPC ............... *H01G 4/30* (2013.01); *H01G 4/008* (2013.01); *H01G 4/012* (2013.01); *H01G 4/1218* (2013.01)

(58) Field of Classification Search
 CPC .......... H01G 4/30; H01G 4/008; H01G 4/012; H01G 4/1227; H01G 4/2325; H01G 4/1209; H01G 4/228; H01G 4/306; H01G 4/248; H01G 4/1218; H01G 4/236
 See application file for complete search history.

(56) References Cited

U.S. PATENT DOCUMENTS

| | | | |
|---|---|---|---|
| 2005/0219795 A1* | 10/2005 | Murasawa | H01G 4/12 361/321.2 |
| 2016/0217924 A1* | 7/2016 | Morita | C04B 35/4682 |
| 2017/0345567 A1* | 11/2017 | Sakate | H01G 4/1218 |
| 2021/0383973 A1* | 12/2021 | Matsumoto | C04B 35/6342 |

FOREIGN PATENT DOCUMENTS

| | | |
|---|---|---|
| JP | H11-045617 A | 2/1999 |
| JP | 2016-192477 A | 11/2016 |

* cited by examiner

*Primary Examiner* — Michael P McFadden
(74) *Attorney, Agent, or Firm* — Morgan, Lewis & Bockius LLP (57) ABSTRACT

A multilayer electronic component includes: a body including dielectric layers and internal electrodes alternately disposed with the dielectric layers; and external electrodes disposed on the body. One of the internal electrodes includes interfacial portions disposed at interfaces thereof with two of the dielectric layers, between which the one of the internal electrodes is disposed, and a central portion disposed between the interfacial portions, and one of the interfacial portions has a Mn content higher than an average Mn content of the central portion and an average Mn content of one of the dielectric layers which is in contact with the one of the interfacial portions.

13 Claims, 7 Drawing Sheets

MULTILAYER ELECTRONIC COMPONENT

CROSS-REFERENCE TO RELATED APPLICATION(S)

This application claims benefit of priority to Korean Patent Application No. 10-2020-0183841 filed on Dec. 24, 2020 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), one of multilayer electronic components, is a chip-type condenser mounted on a printed circuit board in various electronic products, such as an image device, e.g. a liquid crystal display (LCD) or a plasma display panel (PDP), a computer, a smartphone, and a mobile phone, to serve to charge or discharge electricity therein or therefrom.

The multilayer ceramic capacitor may be used as a component for various electronic apparatuses because it has a small size, secures a high capacitance, and may be easily mounted. In accordance with miniaturization and an increase in output of various electronic apparatuses such as computers and mobile devices, there has been an increasing demand for miniaturization and an increase in capacitance of the multilayer ceramic capacitor.

In order to achieve the miniaturization and the increase in capacitance of the multilayer ceramic capacitor, it is necessary to increase the number of stacked layers by forming dielectric layers and internal electrodes to be thin. Currently, the thickness of internal electrodes has reached a level of about 0.6 µm, and research into reducing the thickness of internal electrodes is being continuously conducted.

However, as the thickness of the internal electrode decreases, there is a concern that the internal electrode may have problems such as a disconnection phenomenon, a decrease in insulation resistance, and a decrease in withstand voltage, causing a deterioration in reliability.

SUMMARY

An aspect of the present disclosure may provide a multilayer electronic component having superior reliability.

Another aspect of the present disclosure may provide a multilayer electronic component having improved withstand voltage characteristics.

Another aspect of the present disclosure may achieve miniaturization and an increase in capacitance of a multilayer electronic component.

According to an aspect of the present disclosure, a multilayer electronic component includes: a body including dielectric layers and internal electrodes alternately disposed with the dielectric layers; and external electrodes disposed on the body. One of the internal electrodes includes interfacial portions disposed at interfaces thereof with two of the dielectric layers, between which the one of the internal electrodes is disposed, and a central portion disposed between the interfacial portions, and one of the interfacial portions has a Mn content higher than an average Mn content of the central portion and an average Mn content of one of the dielectric layers and an average Mn content of the central portion which is in contact with the one of the interfacial portions.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

In the drawings, a first direction may be defined as a stacked direction or a thickness T direction, a second direction may be defined as a length L direction, and a third direction may be defined as a width T direction.

Multilayer Electronic Component

Figure 1:
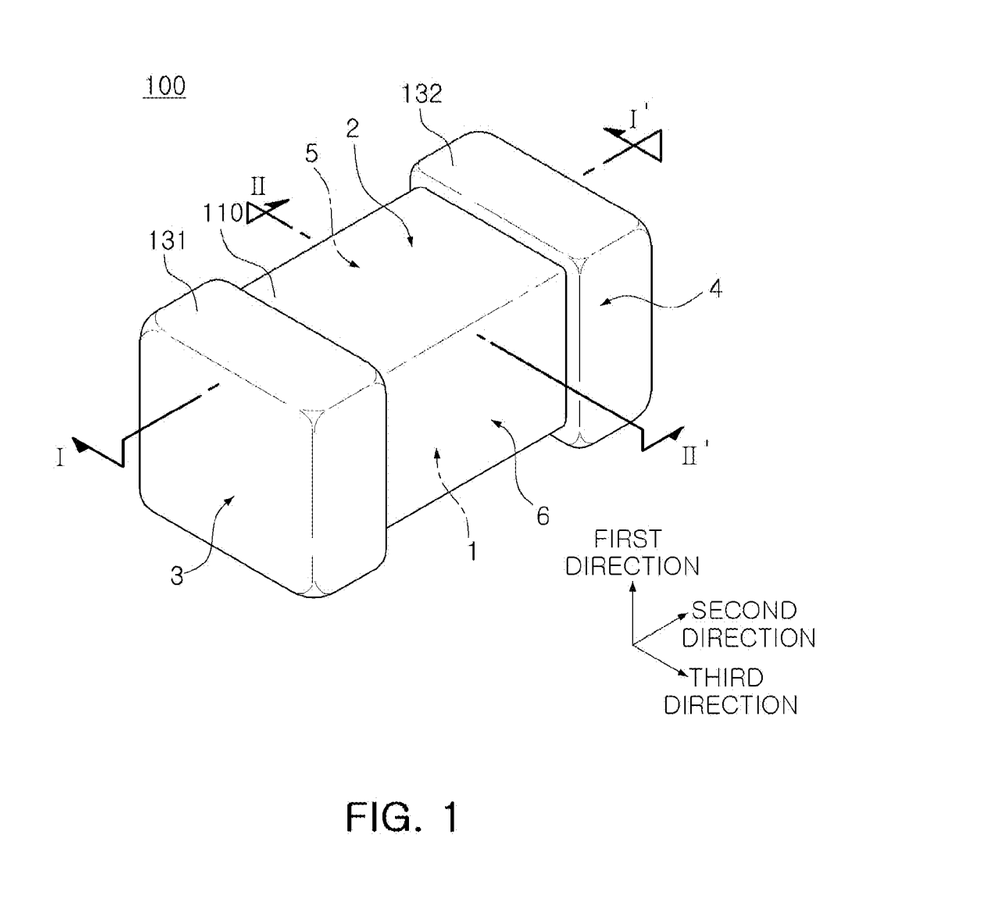
FIG. 1 is a schematic perspective view illustrating a multilayer electronic component according to an exemplary embodiment in the present disclosure.

FIG. 1 is a schematic perspective view illustrating a multilayer electronic component according to an exemplary embodiment in the present disclosure.

Figure 2:
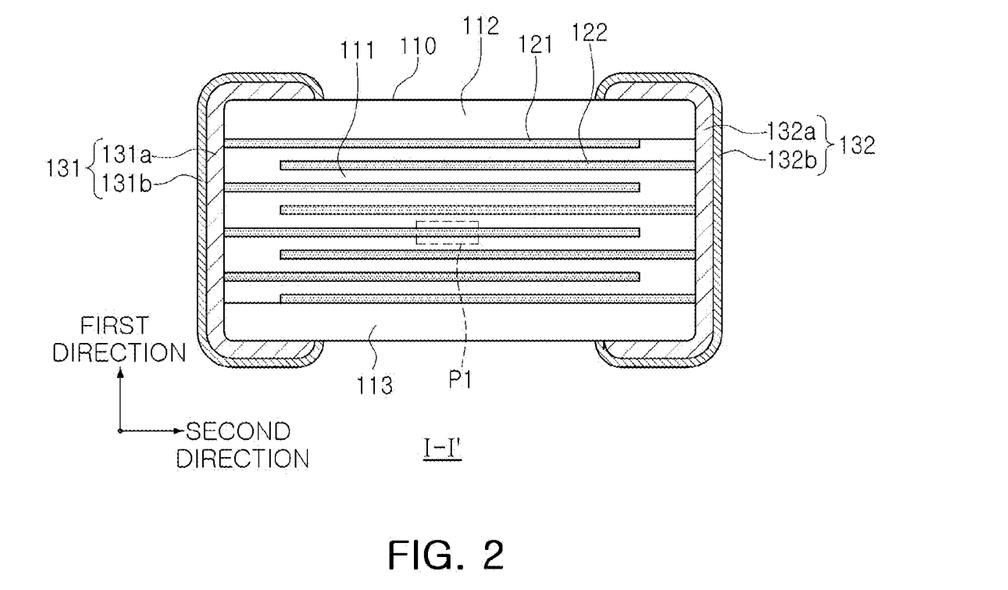
FIG. 2 is a schematic cross-sectional view taken along line I-I' of FIG. 1.

FIG. 2 is a schematic cross-sectional view taken along line I-I' of FIG. 1.

Figure 3:
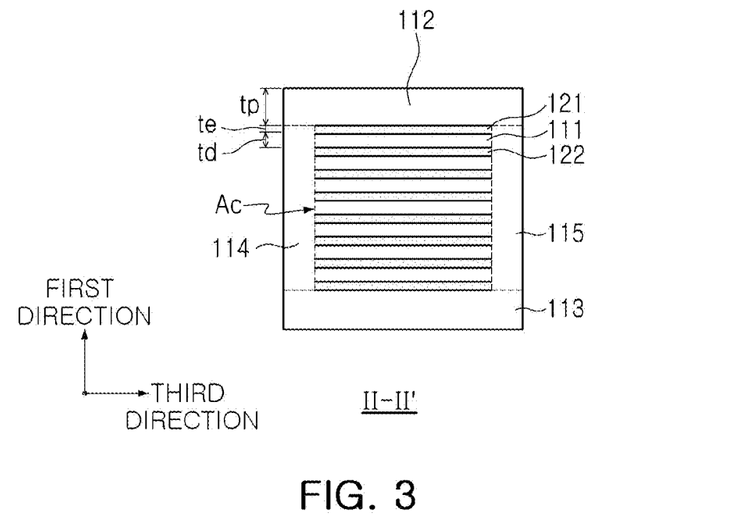
FIG. 3 is a schematic cross-sectional view taken along line II-II' of FIG. 1.

FIG. 3 is a schematic cross-sectional view taken along line II-II' of FIG. 1.

Figure 4:
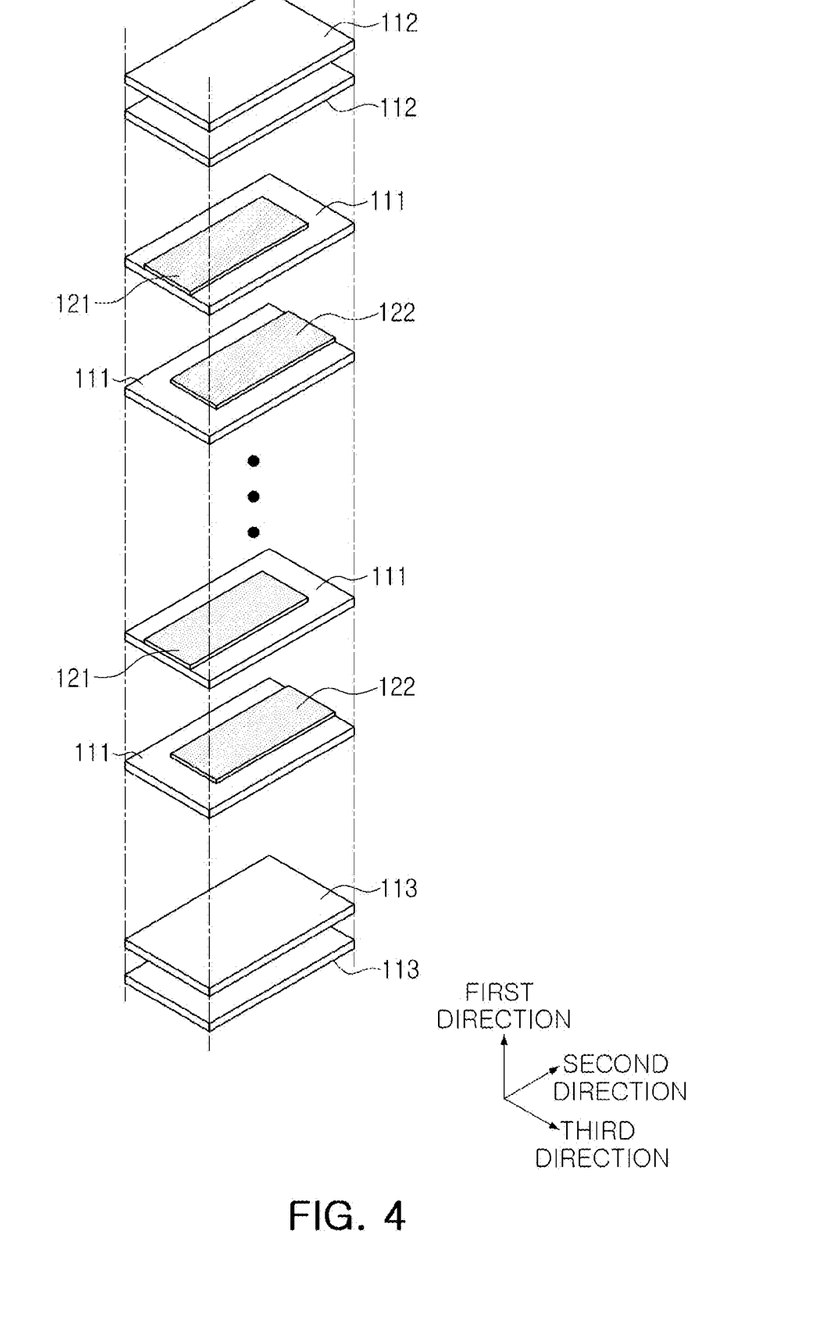
FIG. 4 is a schematic exploded perspective view illustrating a body of the multilayer electronic component according to the exemplary embodiment in the present disclosure.

FIG. 4 is a schematic exploded perspective view illustrating a body of the multilayer electronic component according to the exemplary embodiment in the present disclosure.

Figure 5:
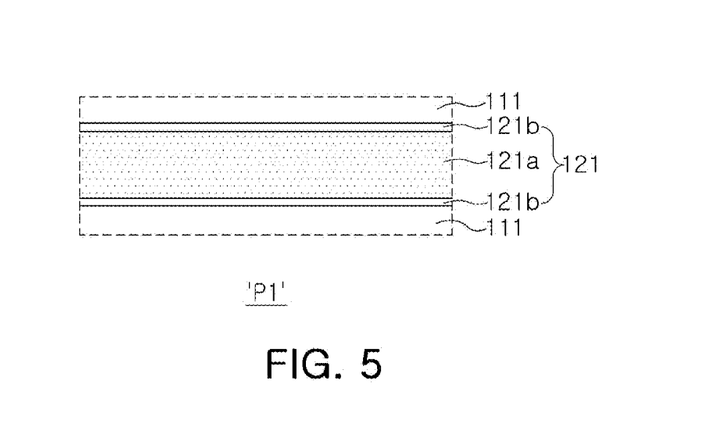
FIG. 5 is an enlarged view illustrating region P1 of FIG. 2.

FIG. 5 is an enlarged view illustrating region P1 of FIG. 2.

Hereinafter, a multilayer electronic component according to an exemplary embodiment in the present disclosure will be described in detail with reference to FIGS. 1 through 5.

A multilayer electronic component 100 according to an exemplary embodiment in the present disclosure may include: a body 110 including dielectric layers 111 and internal electrodes 121 and 122 alternately disposed with the dielectric layers; and external electrodes 131 and 132 disposed on the body. Each of the internal electrodes 121 and 122 may include interfacial portions 121b or 122b disposed at interfaces thereof with the dielectric layers and a central portion 121a or 122a disposed between the interfacial portions, and each of the interfacial portions may have a Mn content higher than an average Mn content of the dielectric layers and an average Mn content of the internal electrodes.

In the body 110, the dielectric layers 111 and the internal electrodes 121 and 122 may be alternately stacked.

A specific shape of the body 110 is not particularly limited, and may be a hexahedral shape or a shape similar to the hexahedral shape, as illustrated in the drawings. Although the body 110 does not have a hexahedral shape having perfectly straight lines due to shrinkage of ceramic powder particles included in the body 110 in a sintering process, the body 110 may have a substantially hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

A plurality of dielectric layers 111 forming the body 110 may be in a sintered state, and the dielectric layers 111 may be integrated with each other, making it difficult to identify a boundary between adjacent dielectric layers 111 without using a scanning electron microscope (SEM).

According to the exemplary embodiment in the present disclosure, a raw material forming the dielectric layer 111 is not particularly limited as long as a sufficient capacitance may be obtained. For example, a barium titanate-based material, a lead composite perovskite-based material, a strontium titanate-based material, or the like may be used as the raw material of the dielectric layer 111. The barium titanate-based material may include $BaTiO_3$-based ceramic powder particles. Examples of the $BaTiO_3$-based ceramic powder particles may include $BaTiO_3$ and $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which calcium (Ca), zirconium (Zr), or the like is partially solid-dissolved in $BaTiO_3$.

The material forming the dielectric layer 111 may include various ceramic additives, organic solvents, binders, dispersants, and the like added to powder particles, such as barium titanate ($BaTiO_3$) powder particles, according to an object of the present disclosure.

Meanwhile, a thickness td of each of the dielectric layers 111 does not need to be particularly limited.

However, in general, when the dielectric layer 111 is formed to have a small thickness of less than 0.6 μm, in particular, when the thickness td of the dielectric layer 111 is 0.45 μm or less, there is concern about a deterioration of reliability.

However, as will be described below, according to the exemplary embodiment in the present disclosure, the reliability of the multilayer electronic component can be improved by the internal electrode including interfacial portions with a high Mn content at interfaces thereof with the dielectric layers. Thus, the reliability can be improved while securing the thickness td of the dielectric layer 111 as small as 0.45 μm or less.

Therefore, when the thickness td of the dielectric layer 111 is 0.45 μm or less, the effect according to the present disclosure may be more remarkable, making it easier to achieve the miniaturization and the increase in capacitance of the multilayer electronic component.

The thickness td of the dielectric layer 111 may refer to an average thickness of the dielectric layers 111 respectively disposed between the first and second internal electrodes 121 and 122.

The average thickness of the dielectric layers 111 may be measured from an image obtained by scanning a cross section of the body 110 in the length and thickness (L-T) directions with a scanning electron microscope (SEM).

For example, with respect to any one of the dielectric layers extracted from the image obtained by scanning the cross section of the body 110 in the length and thickness (L-T) directions with the scanning electron microscope (SEM) after cutting a central portion of the body 110 in the width direction, thicknesses of the dielectric layer may be measured at 30 points arranged at equal intervals in the length direction to obtain an average value thereof.

The thicknesses of the dielectric layer measured at the 30 points arranged at equal intervals may be measured in a capacitance forming portion Ac referring to a region where the first and second internal electrodes 121 and 122 overlap each other.

The body 110 may include a capacitance forming portion Ac disposed in the body 110 and forming a capacitance by including first internal electrodes 121 and second internal electrodes 122 disposed to face each other with each of the dielectric layers 111 interposed therebetween, and cover portions 112 and 113 formed on upper and lower surfaces of the capacitance forming portion Ac, respectively.

In addition, the capacitance forming portion Ac, which contributes to forming a capacitance of a capacitor, may be formed by repeatedly stacking a plurality of first and second internal electrodes 121 and 122 with each of the dielectric layers 111 interposed therebetween.

The upper cover portion 112 and the lower cover portion 113 may be formed by stacking a single dielectric layer or two or more dielectric layers on each of the upper and lower surfaces of the capacitance forming portion Ac in the thickness direction, and may basically serve to prevent damage to the internal electrodes due to physical or chemical stress.

The upper cover portion 112 and the lower cover portion 113 may include the same type of material as the dielectric layers 111, while not including internal electrodes.

That is, the upper cover portion 112 and the lower cover portion 113 may include a ceramic material such as a barium titanate ($BaTiO_3$)-based ceramic material.

Meanwhile, a thickness of each of the cover portions 112 and 113 does not need to be particularly limited. However, the thickness tp of each of the cover portions 112 and 113 may be 20 μm or less in order to more easily achieve the miniaturization and the increase in capacitance of the multilayer electronic component.

In addition, margin portions 114 and 115 may be disposed on side surfaces of the capacitance forming portion Ac.

The margin portions 114 and 115 may include a margin portion 114 disposed on the sixth surface 6 of the body 110 and a margin portion 115 disposed on the fifth surface 5 of the body 110. That is, the margin portions 114 and 115 may be disposed on opposite side surfaces of the ceramic body 110 in the width direction, respectively.

The margin portions 114 and 115 may refer to regions between both distal ends of the first and second internal electrodes 121 and 122 and boundary surfaces of the body 110 in a cross section of the body 110 cut in the width and thickness (W-T) directions, as illustrated in FIG. 3.

The margin portions 114 and 115 may basically serve to prevent damage to the internal electrodes due to physical or chemical stress.

The margin portions 114 and 115 may be formed by applying a conductive paste onto ceramic green sheets to form internal electrodes, except for locations on which the margin portions are to be formed.

Alternatively, in order to suppress steps generated by the internal electrodes 121 and 122, the margin portions 114 and 115 may be formed by cutting the ceramic green sheets to which the conductive paste is applied, after being stacked, so that the internal electrodes are exposed to the fifth and sixth surfaces 5 and 6 of the body, and then stacking a single dielectric layer or two or more dielectric layers on each of the opposite side surfaces of the capacitance forming portion Ac in the width direction.

The internal electrodes 121 and 122 may be alternately disposed with the dielectric layers 111.

The internal electrodes 121 and 122 may include first and second internal electrodes 121 and 122. The first and second internal electrodes 121 and 122 may be alternately disposed to face each other with each of the dielectric layers 111, which constitute the body 110, being interposed therebetween, and may be exposed to the third and fourth surfaces 3 and 4 of the body 110, respectively.

Referring to FIG. 2, the first internal electrodes 121 may be spaced apart from the fourth surface 4 of the body 110 and exposed through the third surface 3 of the body 110, and the second internal electrodes 122 may be spaced apart from the third surface 3 of the body 110 and exposed through the fourth surface 4 of the body 110.

In this case, the first and second internal electrodes 121 and 122 may be electrically disconnected from each other by the dielectric layers 111 respectively disposed therebetween.

Referring to FIG. 4, the body 110 may be formed by alternately stacking ceramic green sheets on which the first internal electrodes 121 are printed and ceramic green sheets on which the second internal electrodes 122 are printed and then sintering the stacked ceramic green sheets.

According to the exemplary embodiment in the present disclosure, the internal electrodes 121 may include interfacial portions 121b disposed at interfaces thereof with the dielectric layers 111 and a central portion 121a disposed between the interfacial portions, and each of the interfacial portions 121b may have a Mn content higher than an average Mn content of the dielectric layers 111 and an average Mn content of the central portion 121a. Similarly, the internal electrodes 122 may include interfacial portions disposed at interfaces thereof with the dielectric layers 111 and a central portion disposed between the interfacial portions, and each of the interfacial portions of the internal electrodes 122 may have a Mn content higher than an average Mn content of the dielectric layers 111 and an average Mn content of the central portion of the internal electrodes 122.

Since the Mn content of each of the interfacial portions 121b and 122b is higher than the average Mn content of the dielectric layers 111 and the average Mn content of the central portions of the internal electrodes 121 and 122, high interfacial resistance can be secured, thereby improving withstand voltage characteristics and improving reliability.

In the exemplary embodiment, the interfacial portions 121b and 122b may be continuously disposed entirely over the interfaces thereof with the dielectric layers 111. Accordingly, high interfacial resistance can be secured over the entire interfaces thereof with the dielectric layers 111, thereby further improving the effect in improving the withstand voltage characteristics and the reliability.

In the exemplary embodiment, the average Mn content of the dielectric layers 111 may be higher than that of the central portions of the internal electrodes 121 and 122.

Mn may spread uniformly in the dielectric layers because it has high wettability with ceramic, but Mn in the internal electrodes moves toward the dielectric layers in the sintering process. Accordingly, the average Mn content of the dielectric layers 111 may be higher than the average Mn content of the central portions of the internal electrodes 121 and 122.

In the exemplary embodiment, a thickness of each of the interfacial portions 121b and 122b may be 5 nm or more and 20 nm or less.

If the thickness of each of the interfacial portions 121b and 122b is less than 5 nm, there is concern that sufficient interfacial resistance may not be secured.

On the other hand, if the thickness of each of the interfacial portions 121b and 122b is more than 20 nm, there is concern that secondary phases may be produced in the dielectric with an increased frequency, causing a decrease in capacitance and a deterioration in withstand voltage characteristics of the multilayer electronic component. Furthermore, a Mn-agglomerated phenomenon may occur in the interfacial portions 121b and 122b, making it difficult to form the interfacial portions 121b and 122b to be continuously disposed entirely over the interfaces thereof with the dielectric layers 111. Therefore, the upper limit of the thickness of each of the interfacial portions 121b and 122b is preferably 20 nm. In this case, in order to sufficiently secure the effect in improving withstand voltage characteristics caused by arranging the interfacial portions 121b and 122b, the upper limit of the thickness of each of the interfacial portions 121b and 122b may be more preferably 10 nm.

In the exemplary embodiment, the Mn content of each of the interfacial portions 121b and 122b may be 0.035 at % or more and 0.36 at % or less.

If the Mn content of each of the interfacial portions 121b and 122b is less than 0.035 at %, there is concern that sufficient interfacial resistance may not be secured, causing an insufficient effect in improving withstand voltage characteristics and reliability.

On the other hand, if the Mn content of each of the interfacial portions 121b and 122b is more than 0.36 at %, there is concern that secondary phases may be produced in the dielectric layers with an increased frequency, causing a decrease in capacitance and a deterioration in withstand voltage characteristics of the multilayer electronic component.

Meanwhile, a material for forming the internal electrodes 121 and 122 is not particularly limited, and may have excellent electrical conductivity. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof. However, in order to easily form the interfacial portions 121b and 122b with a high Mn content, the internal electrodes 121 and 122 may preferably include nickel (Ni) as a main component thereof.

In addition, the internal electrodes 121 and 122 may be formed by printing a conductive paste for internal electrodes including one or more of nickel (Ni), copper (Cu), palladium (Pd), silver (Ag), gold (Au), platinum (Pt), tin (Sn), tungsten (W), titanium (Ti), and alloys thereof on ceramic green sheets. A method of printing the conductive paste for internal electrodes may be a screen-printing method, a gravure printing method, or the like, but is not limited thereto.

A method of forming the interfacial portions 121b and 122b with a high Mn content does not need to be particularly limited.

However, Mn may generally be included as an additive of a dielectric composition. When Mn is included as an additive of a dielectric composition, it is difficult to form a layer having a high Mn concentration at an interface between an internal electrode and a dielectric layer because Mn has a uniformly spreading characteristic in the dielectric.

Thus, the interfacial portions 121b and 122b with a high Mn content may be formed by adding a Mn oxide to the conductive paste for internal electrodes, coating an interface with an Mn oxide through spray coating after printing the conductive paste for internal electrodes on ceramic green sheets, adding a Mn oxide through a vapor deposition method such as chemical vapor deposition (CVD) or physical vapor deposition (PVD), or the like.

As a specific example, the internal electrodes 121 and 122 may be formed using a conductive paste for internal electrodes including a Ni powder particle, a Mn oxide, and a ceramic additive, with a Mn oxide content of 0.01 to 3 wt % relative to 100 wt % of the Ni powder particle included in the conductive paste for internal electrodes.

If the Mn oxide content is less than 0.01 wt %, there is concern that sufficient interfacial resistance may not be secured. If the Mn oxide content is more than 3 wt %, there is concern that secondary phases may be produced in the dielectric layers with an increased frequency, causing a decrease in capacitance and a deterioration in withstand voltage characteristics of the multilayer electronic component.

In the exemplary embodiment, the central portions 121a and 122a of the internal electrodes 121 and 122 may include a ceramic additive, and the ceramic additive may have a Mn content higher than the average Mn content of the central portions 121a and 122a.

Since Mn has high wettability with ceramic, Mn may spread uniformly in the ceramics, and may also be distributed in the ceramic additive trapped in the internal electrodes. Accordingly, the Mn content of the ceramic additive may be higher than the average Mn content of the central portions 121a and 122a.

In this case, the internal electrodes 121 and 122 may be formed using a paste including a Ni powder particle, a Mn oxide, and a ceramic additive, with a Mn oxide content of 0.01 to 3 wt % relative to 100 wt % of the Ni powder particle included in the paste.

Meanwhile, a thickness to of each of the internal electrodes 121 and 122 does not need to be particularly limited.

However, in general, when the internal electrode is formed to have a small thickness of less than 0.6 μm, in particular, when the thickness of the internal electrode is 0.45 μm or less, there is concern about a deterioration in reliability.

As described above, according to the exemplary embodiment in the present disclosure, the reliability of the multilayer electronic component can be improved by the internal electrode including interfacial portions with a high Mn content at interfaces thereof with the dielectric layers. Thus, superior reliability can be secured even when the thickness of each of the internal electrodes 121 and 122 is 0.45 μm or less.

Therefore, when the thickness of each of the internal electrodes 121 and 122 is 0.45 μm or less, the effect according to the present disclosure may be more remarkable, making it easier to achieve the miniaturization and the increase in capacitance of the multilayer electronic component.

The thickness to of each of the internal electrodes 121 and 122 may refer to an average thickness of the internal electrodes 121 and 122.

The average thickness of the internal electrodes 121 and 122 may be measured from an image obtained by scanning a cross section of the body 110 in the length and thickness (L-T) directions with a scanning electron microscope (SEM).

For example, with respect to any one of the first and second internal electrodes 121 and 122 extracted from the image obtained by scanning the cross section of the body 110 in the first and second directions (length and thickness directions) with the scanning electron microscope (SEM) after cutting a central portion of the body 110 in the third direction (width direction), thicknesses of the internal electrode may be measured at 30 points arranged at equal intervals in the length direction to obtain an average value thereof.

The thicknesses of the internal electrode, which are measured at the 30 points arranged at equal intervals, may be measured in the capacitance forming portion Ac referring to a region where the internal electrodes 121 and 122 overlap each other.

The external electrodes 131 and 132 may be disposed on the third and fourth surfaces 3 and 4 of the body 110, respectively.

The external electrodes 131 and 132 may include first and second external electrodes 131 and 132 disposed on the third and fourth surfaces 3 and 4 of the body 110, respectively, and connected to the first and second internal electrodes 121 and 122, respectively.

Referring to FIG. 1, the external electrodes 131 and 132 may be disposed to cover both end surfaces of the margin portions 114 and 115 in the second direction, respectively.

The multilayer electronic component 100 is described in the present exemplary embodiment as having two external electrodes 131 and 132, but the number, shapes, and the like of external electrodes 131 and 132 may be changed depending on shapes of the internal electrodes 121 and 122 or according to other purposes.

Meanwhile, the electrode layers 131 and 132 may be formed of any material having electrical conductivity, such as metal, and a specific material for the electrode layers 131 and 132 may be determined in consideration of electrical characteristics, structural stability, and the like. Furthermore, the electrode layers 131 and 132 may have a multilayer structure.

For example, the external electrodes 131 and 132 may include electrode layers 131a and 132a disposed on the body 110 and plating layers 131b and 132b formed on the electrode layers 131a and 132a, respectively.

As a more specific example of the electrode layers 131a and 132a, the electrode layers 131a and 132a may be fired electrodes including conductive metal and glass, or resin-based electrodes including conductive metal and resin.

Alternatively, each of the electrode layers 131a and 132a may be formed of a combination of a fired electrode and a resin-based electrode that are sequentially formed on the body. In addition, each of the electrode layers 131a and 132a may be formed by transferring a sheet including conductive metal onto the body or by transferring a sheet including conductive metal onto a fired electrode.

The conductive metal included in the electrode layers 131a and 132a may be a material having excellent electrical connectivity, but is not limited thereto. For example, the conductive metal may be one or more of nickel (Ni), copper (Cu), and alloys thereof.

The plating layers 131b and 132b may serve to improve mounting characteristics. A type of the plating layers 131b and 132b is not particularly limited, and each of the plating layers 131b and 132b may be a plating layer including one or more of Ni, Sn, Pd, and alloys thereof, and may be formed as a plurality of layers.

As a more specific example of the plating layers 131b and 132b, each of the plating layers 131b and 132b may be a Ni plating layer, a Sn plating layer, or a combination of a Ni plating layer and a Sn plating layer that are sequentially formed on each of the electrode layers 131a and 132a. Alternatively, each of the plating layers 131b and 132b may include a plurality of Ni plating layers and/or a plurality of Sn plating layers.

A size of the multilayer electronic component 100 does not need to be particularly limited.

However, in order to achieve both the miniaturization and the increase in capacitance of the multilayer electronic component, it is necessary to increase the number of stacks by forming the dielectric layers and the internal electrodes to be thin. Thus, when the multilayer electronic component 100 has a size of 0.0402 (length×width, 0.4 mm×0.2 mm) or less, the effect in improving reliability and a withstand voltage according to the present disclosure can be more remarkable.

Therefore, considering a manufacturing error, a size of the external electrodes, and the like, when the multilayer electronic component 100 has a length of 0.44 mm or less and a width of 0.22 mm or less, the effect in improving reliability according to the present disclosure can be more remarkable. Here, the length of the multilayer electronic component 100 may refer to a maximum size of the multilayer electronic component 100 in the second direction, and the width of the multilayer electronic component 100 may refer to a maximum size of the multilayer electronic component 100 in the third direction.

EXAMPLES

Sample chips were manufactured so that interfacial portions of internal electrodes have respective thicknesses described in Table 1 below by adjusting a Mn oxide content relative to a Ni powder particle in a paste for the internal electrodes. Reliabilities and withstand voltages of the sample chips were measured and the results are illustrated in Table 1 below.

After fabricating a thin-piece sample for analysis using an FIB micro-sampling processing method from a cross section (W-T cross section) of each of the sample chips cut in the first and third directions at a ½ point of the sample chip in the second direction, interfaces between internal electrodes and dielectric layers in the sample for analysis were observed through transmission electron microscopy (TEM) line profile. Each of the thicknesses of the interfacial portions of the internal electrodes described in Table 1 below is an average value of thicknesses of three internal electrodes positioned in the middle of the sample in the first and third directions.

Figure 9A:
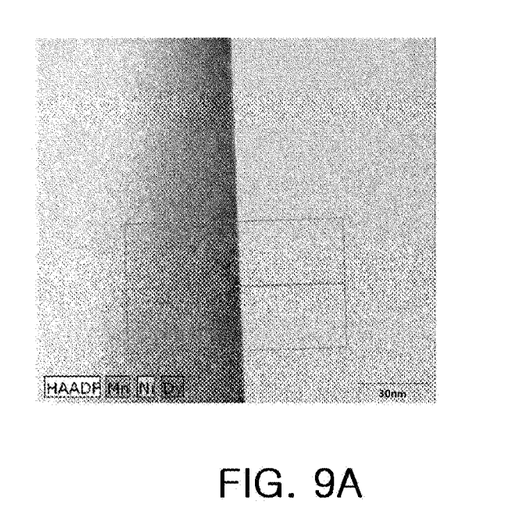
FIGS. 9A and 9B are images obtained by analyzing the interface between the internal electrode and the dielectric layer through a TEM line profile in Test No. 2.

Referring to FIG. 9A, the thickness of the interfacial portion was defined as a distance, at an interface between an internal electrode and a dielectric layer, from a point where an Mn content of the internal electrode becomes higher than an average Mn content of the dielectric layer through a point where the Mn content of the internal electrode reaches a peak value to a point where the Mn content of the internal electrode becomes lower than the average Mn content of the dielectric layer. Here, the average Mn content of the dielectric layer was measured by analyzing a TEM line profile, and specifically, by obtaining an average Mn content value in a region of each TEM line profile where a Ni content remains 1.0 at % or less up to a point at which the Ni content reaches 1.0 at %.

The withstand voltage was defined as a voltage at a point where a current became 20 mA or more by connecting each of the sample chips to a circuit and gradually raising the voltage from 0 V by 0.5 V each time. Using a withstand voltage in Test No. 1 as a reference value of 100%, relative withstand voltage values were described in the other test numbers.

Reliability was evaluated through a high acceleration life test (HALT). With respect to 400 samples per each test number, after a reference voltage was applied to the samples at a temperature of 105° C. for 6 hours, samples whose insulation resistance values were lowered by 1/10^5 or less from initial values were determined to be faulty, and the number of sample chips corresponding to the faulty samples was described.

TABLE 1

| Test No. | Thickness of interfacial portion (nm) | Reliability | Withstand voltage |
|---|---|---|---|
| 1* | 0 | 4/400 | 100% |
| 2 | 5 | 0/400 | 105% |
| 3 | 10 | 0/400 | 110% |
| 4 | 20 | 0/400 | 100% |
| 5* | 30 | 4/400 | 95% |

In Test No. 1, where no Mn oxide was added, four reliability-faulty samples were generated, indicating inferior reliability.

In Test Nos. 2 to 4, where the interfacial portion had a thickness of 5 to 20 nm, it was confirmed that reliability is superior and withstand voltage characteristics are also superior.

However, in Test No. 4, where the interfacial portion had a thickness of 20 nm, the samples had a withstand voltage at the same level as those in Test No. 1, where no Mn oxide was added.

Meanwhile, in Test No. 5, where the interfacial portion had a thickness of 30 nm, it was confirmed that four reliability-faulty samples were generated, indicating inferior reliability, and also, a withstand voltage was lower than that in Test No. 1, where no Mn oxide was added.

Figure 6:
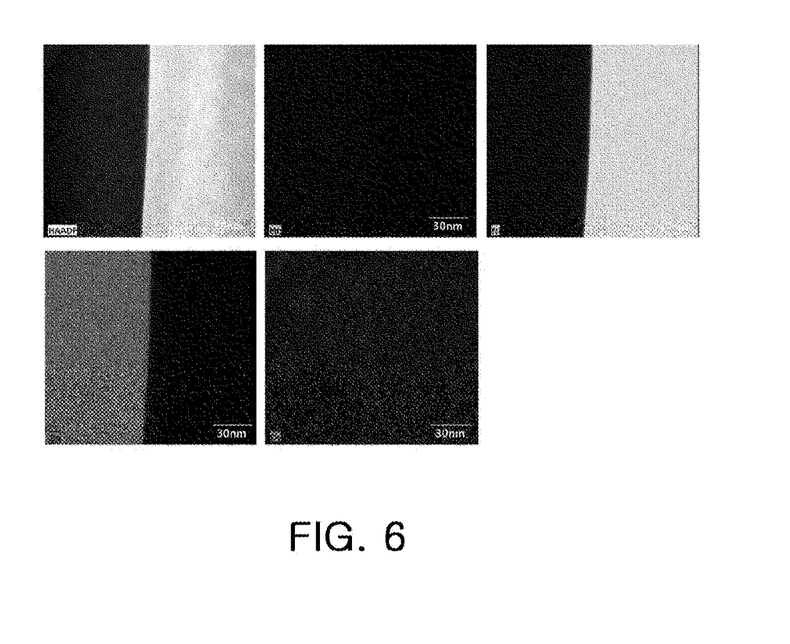
FIG. 6 is an image obtained by analyzing an interface between an internal electrode and a dielectric layer through TEM-EDS mapping in Test No. 1.
Figure 7:
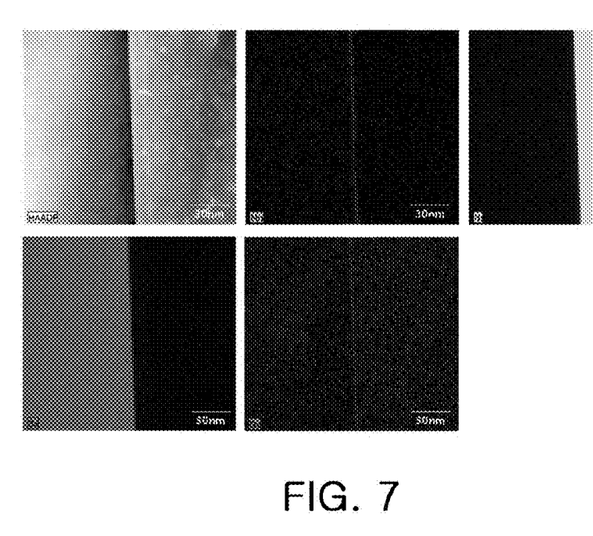
FIG. 7 is an image obtained by analyzing an interface between an internal electrode and a dielectric layer through TEM-EDS mapping in Test No. 2.

FIG. 6 is an image obtained by analyzing an interface between an internal electrode and a dielectric layer through TEM-EDS mapping in Test No. 1. FIG. 7 is an image obtained by analyzing an interface between an internal electrode and a dielectric layer through TEM-EDS mapping in Test No. 2. Upon comparing FIGS. 6 and 7, it can be seen that an interfacial portion with a high Mn content is clearly observed in the form of a layer in FIG. 7.

Figure 8A:
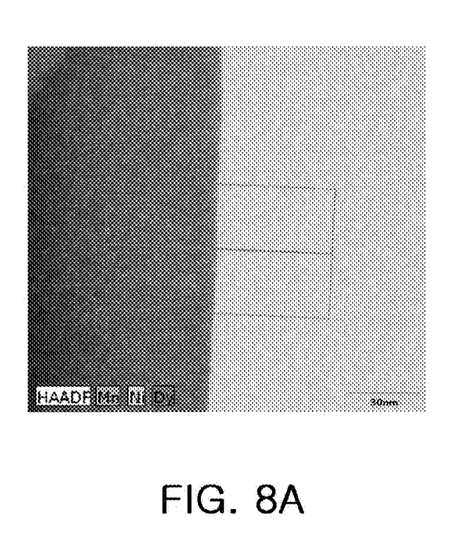
FIGS. 8A and 8B are images obtained by analyzing the interface between the internal electrode and the dielectric layer through a TEM line profile in Test No. 1.
Figure 8B:
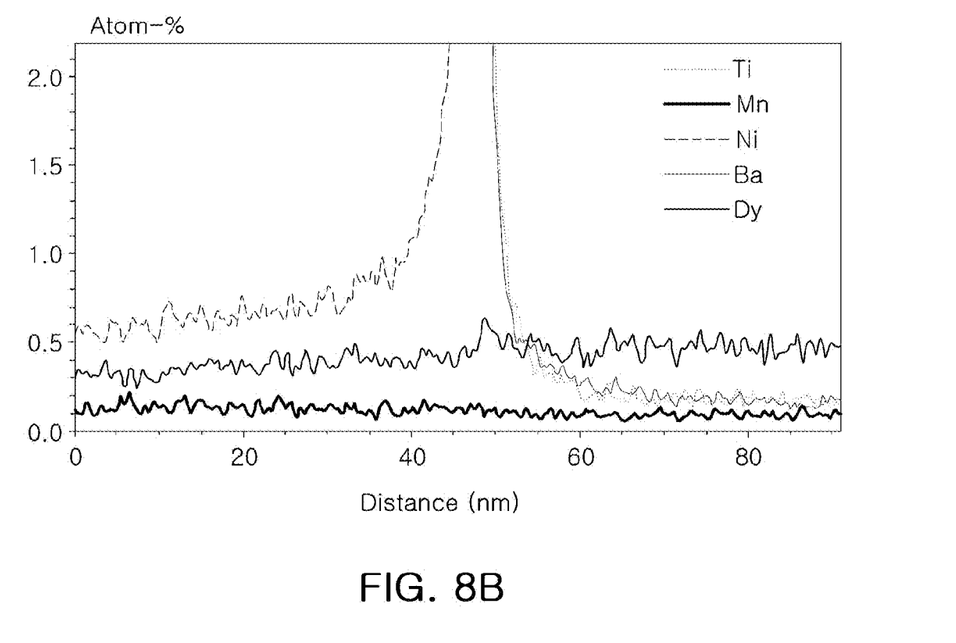
Figure 9B:
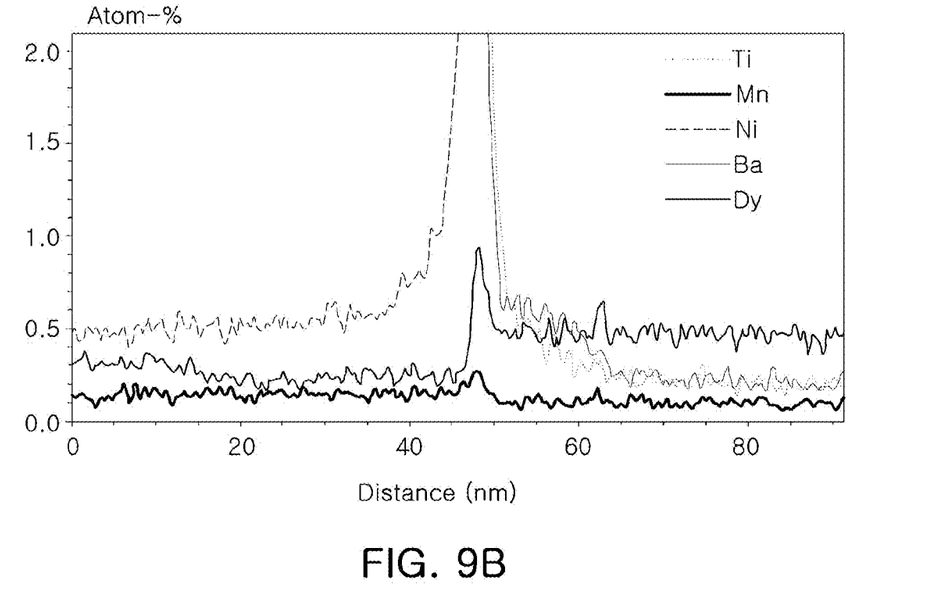

FIGS. 8A and 8B are images obtained by analyzing the interface between the internal electrode and the dielectric layer through a TEM line profile in Test No. 1. FIGS. 9A and 9B are images obtained by analyzing the interface between the internal electrode and the dielectric layer through a TEM line profile in Test No. 2.

Referring to FIGS. 8A and 8B, in Test No. 1, the dielectric layer and the internal electrode have a similar Mn content to each other. Meanwhile, in Test No. 1, where no Mn oxide is added, the Mn content (at %) in FIG. 8B may be considered as noise.

Referring to FIGS. 9A and 9B, in Test No. 2, it can be seen that the Mn content increases rapidly at the interface between the dielectric layer and the internal electrode. In addition, it can be seen that a distance, at the interface between the internal electrode and the dielectric layer, from a point where an Mn content of the internal electrode becomes higher than an average Mn content of the dielectric layer through a point where the Mn content of the internal electrode reaches a peak value to a point where the Mn content of the internal electrode becomes lower than the average Mn content of the dielectric layer, is 5 nm, that is, the interfacial portion has a thickness of 5 nm.

According to FIG. 9B, the interfacial portion had a peak Mn content value of 0.2744 at %, and the dielectric layer had an average Mn content of 0.1317 at % in a region where a Ni content was 1 at % or less. In addition, when an average Mn content in a region where a Ba content rapidly decreases and then remains constant (a region where a distance is 65 nm or more in FIG. 9B) was considered as an average Mn content of a central portion, the average Mn content of the central portion was 0.0965 at %, which was similar to an average Mn content of a central portion in FIG. 8B. Thus, the average Mn content of the central portion in FIG. 9B may be considered as noise like that in FIG. 8B, and it may be considered that Mn is almost absent in the central portion of the internal electrode.

In addition, it can be seen that an actual Mn content of the interfacial portion is in a range of from 0.0352 at % to 0.1779 at %, that is, from the average Mn content of the dielectric layer to the peak Mn content value of the interfacial portion from which the average Mn content of the central portion, which is a noise value, is subtracted.

Figure 10:
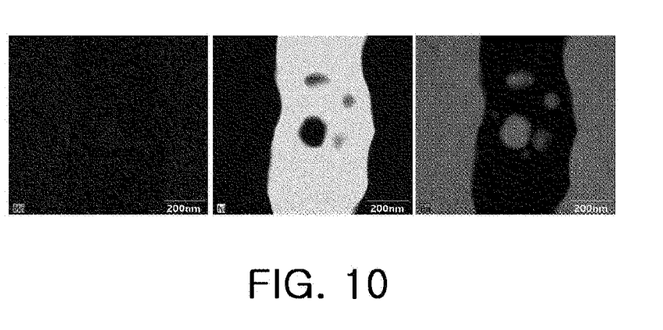
FIG. 10 is an image obtained by analyzing an interface between an internal electrode and a dielectric layer through TEM-EDS mapping in Test No. 6.
Figure 11:
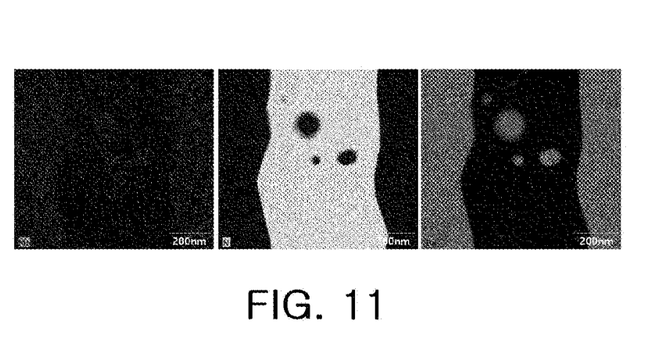
FIG. 11 is an image obtained by analyzing an interface between an internal electrode and a dielectric layer through TEM-EDS mapping in Test No. 7.

FIG. 10 is an image obtained by analyzing an interface between an internal electrode and a dielectric layer through TEM-EDS mapping in Test No. 6. FIG. 11 is an image obtained by analyzing an interface between an internal electrode and a dielectric layer through TEM-EDS mapping in Test No. 7.

In Test Nos. 6 and 7, $BaTiO_3$, which is a ceramic additive, was added to the paste for internal electrodes, unlike Test Nos. 1 to 5. In Test No. 6, no Mn oxide was added, and in Test No. 7, a Mn oxide was added in the same amount as in Test No. 2.

Upon comparing FIGS. 10 and 11, it can be seen that the ceramic additive is trapped in the internal electrode in both Test Nos. 6 and 7. However, it can be seen that the ceramic additive does not contain Mn in Test No. 6, while the ceramic additive contains Mn in Test No. 7.

As set forth above, according to the exemplary embodiment in the present disclosure, the reliability of the multilayer electronic component can be improved by the internal electrode including interfacial portions with a high Mn content at interfaces thereof with the dielectric layers.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including dielectric layers and internal electrodes alternately disposed with the dielectric layers; and
external electrodes disposed on the body,
wherein one of the internal electrodes includes interfacial portions disposed at interfaces thereof with two of the dielectric layers, between which the one of the internal electrodes is disposed, and a central portion disposed between the interfacial portions, and
one of the interfacial portions has a Mn content higher than an average Mn content of the central portion and an average Mn content of one of the dielectric layers which is in contact with the one of the interfacial portions.

2. The multilayer electronic component of claim 1, wherein the one of the interfacial portions is continuously disposed entirely over the interface with the one of the dielectric layers.

3. The multilayer electronic component of claim 1, wherein the average Mn content of the one of the dielectric layers is higher than that of the one of the internal electrodes.

4. The multilayer electronic component of claim 1, wherein the Mn content of the one of the interfacial portions is 0.035 at % or more and 0.36 at % or less.

5. The multilayer electronic component of claim 1, wherein the one of the interfacial portions has a thickness of 5 nm or more and 20 nm or less.

6. The multilayer electronic component of claim 1, wherein the one of the interfacial portions has a thickness of 5 nm or more and 10 nm or less.

7. The multilayer electronic component of claim 1, wherein the internal electrodes are formed using a paste including a Ni powder particle and a Mn oxide, with a Mn oxide content of 0.01 to 3 wt % relative to 100 wt % of the Ni powder particle included in the paste.

8. The multilayer electronic component of claim 1, wherein the internal electrodes are formed using a paste including a Ni powder particle, a Mn oxide, and a ceramic additive, with a Mn oxide content of 0.01 to 3 wt % relative to 100 wt % of the Ni powder particle included in the paste.

9. The multilayer electronic component of claim 1, wherein the central portion of the one of the internal electrodes includes a ceramic additive, and the ceramic additive has a Mn content higher than the average Mn content of the one of the dielectric layers and an average Mn content of the one of the internal electrodes.

10. The multilayer electronic component of claim 1, wherein the one of the internal electrodes has an average thickness of 0.45 μm or less.

11. The multilayer electronic component of claim 1, wherein the one of the dielectric layers has an average thickness of 0.45 μm or less.

12. The multilayer electronic component of claim 1, wherein the one of the interfacial portions is continuously disposed entirely over the interface with the one of the dielectric layers,
the Mn content of the one of the interfacial portions is 0.035 at % or more and 0.36 at % or less, and
the one of the interfacial portions has a thickness of 5 nm or more and 20 nm or less.

13. The multilayer electronic component of claim 1, wherein the one of the interfacial portions is continuously disposed entirely over the interface with the one of the dielectric layers,
the Mn content of the one of the interfacial portions is 0.035 at % or more and 0.36 at % or less, and the one of the interfacial portions has a thickness of 5 nm or more and 10 nm or less.

\* \* \* \* \*